(12) United States Patent
Heath et al.

(10) Patent No.: US 11,712,901 B2
(45) Date of Patent: *Aug. 1, 2023

(54) MULTILAYER WHITE PRINTING WITH WHITE-BALANCE

(71) Applicant: FIERY, LLC, Fremont, CA (US)

(72) Inventors: Peter Heath, Alexandria, NH (US); Joseph A. Lahut, Moultonboro, NH (US); Dwight Cram, Concord, NH (US); Bryan Ko, Fremont, CA (US)

(73) Assignee: Fiery, LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/333,453

(22) Filed: May 28, 2021

(65) Prior Publication Data

US 2021/0283924 A1    Sep. 16, 2021

Related U.S. Application Data

(60) Continuation of application No. 16/579,707, filed on Sep. 23, 2019, now Pat. No. 11,020,984, which is a
(Continued)

(51) Int. Cl.
| | | |
|---|---|---|
| *B41J 2/21* | (2006.01) | |
| *H04N 1/54* | (2006.01) | |
| *H04N 1/407* | (2006.01) | |
| *H04N 1/60* | (2006.01) | |
| *B41J 2/045* | (2006.01) | |
| *B41J 19/14* | (2006.01) | |
| *G06K 15/10* | (2006.01) | |
| *H04N 1/40* | (2006.01) | |

(52) U.S. Cl.
CPC .......... *B41J 2/2132* (2013.01); *B41J 2/0458* (2013.01); *B41J 2/2114* (2013.01); *B41J 2/2117* (2013.01); *B41J 2/2128* (2013.01); *B41J 19/142* (2013.01); *H04N 1/4078* (2013.01); *H04N 1/54* (2013.01); *H04N 1/60* (2013.01); *H04N 1/6097* (2013.01); *G06K 15/102* (2013.01); *H04N 1/40087* (2013.01)

(58) Field of Classification Search
CPC ...... B41J 2/0458; B41J 19/142; B41J 2/2128; B41J 2/2114; B41J 2/2117; B41J 2/2132; H04N 1/60; H04N 1/54; H04N 1/4078; H04N 1/6097; H04N 1/40087; G06K 15/102
See application file for complete search history.

(56) References Cited

U.S. PATENT DOCUMENTS 6,834,948 B2    12/2004   Asano et al.
7,562,957 B2    7/2009    Mills et al.
(Continued)

*Primary Examiner* — An H Do
(74) *Attorney, Agent, or Firm* — Perkins Coie LLP

(57) ABSTRACT

White-balance is improved when printing on colored media, while minimizing the time and use of costly materials required by present approaches. In an embodiment, the typical solid white fill or background layer is altered by including in the white layer one or more of the other colors already available in the printer to shade this layer. Thus, a small amount of cyan, for example, helps balance a pink-ish (red) media; yellow is used for blue media; and magenta is used for green media; as well as combinations thereof. A combination of transparent process inks and opaque white helps to maintain brightness (luminosity).

20 Claims, 10 Drawing Sheets

Related U.S. Application Data continuation of application No. 15/641,110, filed on Jul. 3, 2017, now Pat. No. 10,421,289, which is a division of application No. 15/090,310, filed on Apr. 4, 2016, now Pat. No. 9,694,597, which is a division of application No. 14/150,527, filed on Jan. 8, 2014, now Pat. No. 9,302,490.

(56) References Cited

U.S. PATENT DOCUMENTS

| | | |
|---|---|---|
| 8,550,588 B2 | 10/2013 | Hatanaka et al. |
| 8,599,436 B2 | 12/2013 | Sano et al. |
| 8,861,053 B2 | 10/2014 | Nudurumati et al. |
| 9,126,420 B2 | 9/2015 | Heath et al. |
| 9,302,490 B2 | 4/2016 | Heath et al. |
| 9,694,597 B2 | 7/2017 | Heath et al. |
| 10,421,289 B2 | 9/2019 | Heath et al. |
| 11,020,984 B2 * | 6/2021 | Heath .................... B41J 2/2117 |
| 2008/0122882 A1 | 5/2008 | Huang et al. |
| 2009/0207458 A1 | 8/2009 | Doggett et al. |
| 2010/0039658 A1 | 2/2010 | Simmonds et al. |
| 2011/0141173 A1 | 6/2011 | Usuda et al. |
| 2013/0088715 A1 | 4/2013 | Adam et al. |
| 2014/0354726 A1 | 12/2014 | Heath et al. |

\* cited by examiner

|    | 0.00% | 0.39% | 0.78% | 1.18% | 1.57% | 1.96% | 2.35% | 2.76% | 3.14% | 3.53% | 3.92% |
|----|-------|-------|-------|-------|-------|-------|-------|-------|-------|-------|-------|
| Cr | 242 | 242 | 238 | 233 | 227 | 223 | 219 | 219 | 211 | 207 | 205 |
| Cg | 242 | 241 | 210 | 238 | 235 | 234 | 233 | 233 | 230 | 226 | 227 |
| Cb | 245 | 244 | 244 | 243 | 244 | 244 | 244 | 245 | 245 | 244 | 244 |
| Mr | 242 | 241 | 241 | 239 | 241 | 240 | 240 | 239 | 238 | 239 | 239 |
| Mg | 242 | 240 | 234 | 230 | 229 | 224 | 219 | 217 | 213 | 210 | 207 |
| Mb | 245 | 244 | 242 | 241 | 240 | 238 | 237 | 236 | 235 | 234 | 231 |
| Yr | 241 | 241 | 242 | 241 | 240 | 241 | 238 | 242 | 242 | 243 | 243 |
| Yg | 241 | 240 | 240 | 240 | 239 | 239 | 238 | 236 | 239 | 240 | 239 |
| Yb | 244 | 244 | 237 | 234 | 227 | 223 | 221 | 221 | 215 | 213 | 206 |

FIGURE 3

| R | 0.00% | 0.39% | 0.78% | 1.18% | 1.57% | 1.96% | 2.35% | 2.75% | 3.14% | 3.53% | 3.92% | R |
|---|---|---|---|---|---|---|---|---|---|---|---|---|
| M | 0.59% | 0.98% | 2.94% | 3.92% | 4.51% | 5.88% | 7.85% | 8.04% | 9.22% | 10.39% | 10.98% | M |
| C | 0.59% | 0.20% | 1.57% | 2.94% | 4.90% | 6.27% | 7.65% | 7.84% | 10.39% | 10.98% | 11.96% | M |
| Y | -1.18% | -1.37% | 1.57% | 2.55% | 4.90% | 6.67% | 6.67% | 7.06% | 10.00% | 11.18% | 13.73% | M |

M = magenta; C = cyan; Y = yellow; R = requested value; M = measured value

FIGURE 4

MULTILAYER WHITE PRINTING WITH WHITE-BALANCE

CROSS REFERENCE TO RELATED APPLICATIONS

This application is a continuation of U.S. patent application Ser. No. 16/579,707, filed Sep. 23, 2019, which is a continuation of U.S. patent application Ser. No. 15/641,110, filed Jul. 3, 2017, issued as U.S. Pat. No. 10,421,289 on Sep. 24, 2019, which is a division of U.S. patent application Ser. No. 15/090,310, filed Apr. 4, 2016, issued as U.S. Pat. No. 9,694,597 on Jul. 4, 2017, which is a division of U.S. patent application Ser. No. 14/150,527, filed Jan. 8, 2014, issued as U.S. Pat. No. 9,302,490 on Apr. 5, 2016, each of which are incorporated herein in their entirety by this reference thereto.

BACKGROUND OF THE INVENTION

Technical Field

The invention relates to printing. More particularly, the invention relates to multilayer printing with white-balance.

Description of the Background Art

In photography and image processing, color balance is the global adjustment of the intensities of the colors, typically red, green, and blue primary colors. An important goal of this adjustment is to render specific colors, particularly neutral colors, correctly; hence, the general method is sometimes called gray balance, neutral balance, or white balance. Color balance changes the overall mixture of colors in an image and is used for color correction; generalized versions of color balance are used to get colors other than neutrals to also appear correct or pleasing.

Image data acquired by sensors, either film or electronic image sensors, must be transformed from the acquired values to new values that are appropriate for color reproduction or display. Several aspects of the acquisition and display process make such color correction essential, including the fact that the acquisition sensors do not match the sensors in the human eye, that the properties of the display medium must be accounted for, and that the ambient viewing conditions of the acquisition differ from the display viewing conditions.

The color balance operations in popular image editing applications usually operate directly on the red, green, and blue channel pixel values, without respect to any color sensing or reproduction model. In shooting film, color balance is typically achieved by using color correction filters over the lights or on the camera lens.

Sometimes the adjustment to keep neutrals neutral is called white balance, and the phrase color balance refers to the adjustment that in addition makes other colors in a displayed image appear to have the same general appearance as the colors in an original scene. It is particularly important that neutral, i.e. gray, achromatic, and white, colors in a scene appear neutral in the reproduction. Hence, the special case of balancing the neutral colors, sometimes gray balance, neutral balance, or white balance, is a particularly important, perhaps dominant, element of color balancing.

A particular problem occurs when an image is to be printed on a colored or off-white substrate. In such cases, the image can take on distinct color cast. In the art, the influence of an off-white or colored substrate is countered by first printing a layer of white ink on the substrate, thus establishing a neutral base upon which the image can be formed. For example, Vutek PressVu, QS, GS, and HS printers all have the ability to print multiple layers onto colored media, first printing one white layer for a consistent background and then printing other layers for the standard CMYK (cmykW) image. These printers rely on the white ink's pigment and opacity to deliver a solid and consistent white base on which a profiled colored image can be printed.

When printing on strongly colored media, the white ink alone may not have sufficient opacity without being printed in large, costly quantities. For example, when printing on a strong red sheet a single layer of white may appear to have a slightly pink hue. Adding a second layer of white may cure this problem, but at the cost of throughput and ink.

An alternative, but unsatisfactory, solution to this problem is time-consuming re-profiling for strongly colored media and avoiding solid white areas.

It would be advantageous to improve white-balance when printing on colored media, while minimizing the time and use of costly materials required by present approaches.

SUMMARY OF THE INVENTION

Embodiments of the invention improve white-balance when printing on colored media, while minimizing the time and use of costly materials required by present approaches. In an embodiment, the typical solid white fill or background layer is altered by including in the white layer one or more of the other colors already available in the printer to shade this layer. Thus, a small amount of cyan, for example, helps balance a pink-ish (red) media; yellow is used for blue media; and magenta is used for green media; as well as combinations thereof. A combination of transparent process inks and opaque white helps to maintain brightness (luminosity).

BRIEF DESCRIPTION OF THE DRAWINGS

FIG. 3 is an example white balance profile associating a proportion of a CMY color with the corresponding measured RGB values of the printed CMY color, according to an embodiment of the invention;

FIG. 4 is an example white balance profile associating desired CMY colors with a percentage of the corresponding CMY color that causes the printer to create the desired color, according to an embodiment of the invention;

DETAILED DESCRIPTION OF THE INVENTION

Embodiments of the invention improve white-balance when printing on colored media, while minimizing the time and use of costly materials required by present approaches. In an embodiment, the typical solid white fill or background layer is altered by including in the white layer one or more of the other colors already available in the printer to shade this layer. Thus, a small amount of cyan, for example, helps balance a pink-ish (red) media; yellow is used for blue media; and magenta is used for green media; as well as combinations thereof. A combination of transparent process inks and opaque white helps to maintain brightness (luminosity).

Figure 1:
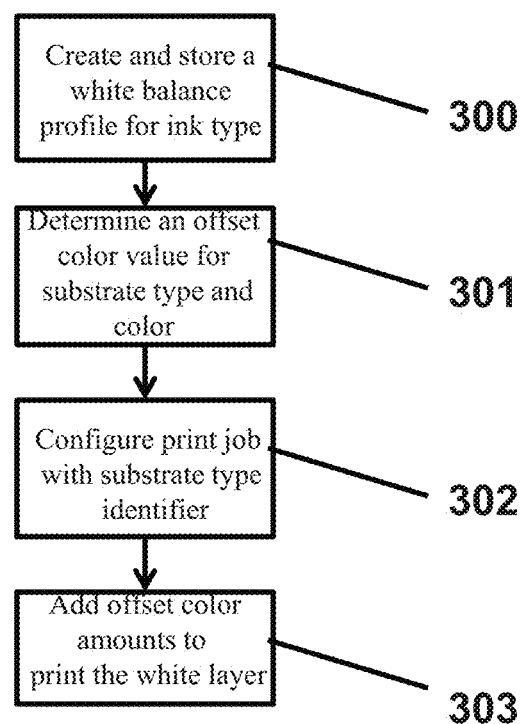
FIG. 1 is a flow diagram that shows at a high level how a printer may be white balanced when printing an image on a colored medium according to an embodiment of the invention.

FIG. 1 is a flow diagram that shows at a high level how a printer may be white balanced when printing an image on a colored medium according to the invention. In an embodiment of the invention, a white balance profile is determined for the specific type of ink installed in the printer. Different ink types may have different white balance profiles (Step 300). In an embodiment, the printer manufacturer may create one or more white balance profiles and install them in a printer memory device. In Step 301, an offset color is determined for a particular type and color of substrate on which printing is desired. The offset color may be stored in a configuration entry for use whenever printing on this substrate type. In Step 302, initiate a print job that includes printing an image on a colored substrate, the corresponding color offsets of which were determined in Step 301. In Step 303, the printer prints a white layer that includes an amount of colored ink determined by looking of the colored substrate offset color values in the white balance profile, and adding a corresponding amount of each offset color.

In an embodiment of the invention, a pre-setting look-up table or other profile storage mechanism may be used to store characterizations for various media in a media database. The media database may store a media identifier that uniquely identifies the media type and color. The color of each media may be explicitly identified or may simply be distinguished from the other colors of that media type in the database. That is, there may be multiple identified media of the same type having different colors, and each may be assigned a different identifier. Thus, each unique substrate identifier unambiguously identifies an amount of ink to add to the white layer to compensate for the color of the substrate. Thus, the predetermined colors and color amounts that are to be added to the white layer for such media to counteract certain popular medium colors may be stored as configuration information in association with the substrate identifier. In this embodiment of the invention, such profile information may be accessed by software within the printer or printer driver, for example via a drop-down menu in the printer's user interface. For example, the user may choose to print on a red medium for which a counteracting color may be added to the white layer to yield a perceptibly neutral "white" layer (i.e. neutral layer may be a shade of gray). In this case, the printer software, operating in the background, may retrieve previously stored information for counteracting the cast of such a medium to establish a correct white balance when printing the white layer.

Creating a White Balance Profile

Different ink sets react to mixing colors differently. Thus, each distinct ink set may have a distinct white balance profile. The white balance profile may associate a variety of Red-Green-Blue (RGB) values with a corresponding mixture of Cyan, Magenta, and Yellow (CMY). Alternatively, the white balance profile may associate CMY values of a desired color with the percentage color, which when requested of the printer, prints the desired color. To determine the desired CMY values, an instrument such as a spectrophotometer may be used to measure the RGB values of a color sample, then convert the RBG values to CMY values for storing in the profile.

Figure 2:
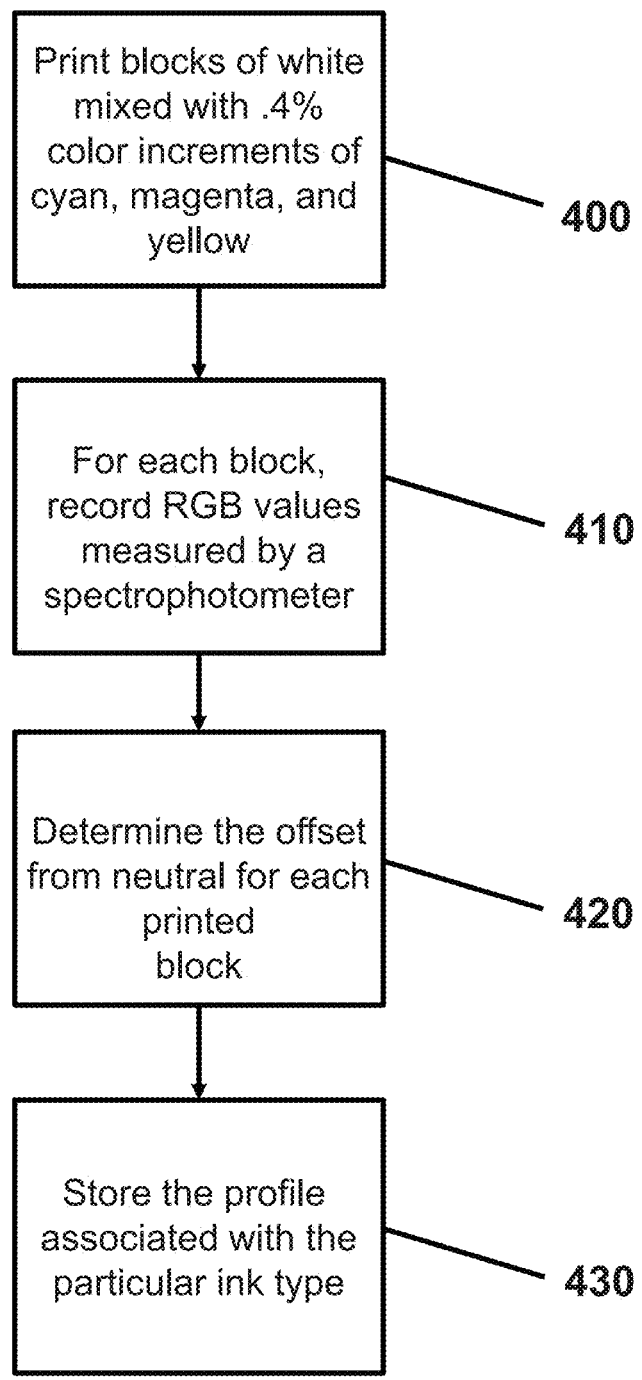
FIG. 2 is a flow diagram that shows how to create a white balance profile for a particular ink type, according to an embodiment of the invention.

FIG. 2 is a flow diagram that shows how to automatically create a white balance profile for a particular ink type. In Step 400, using the desired ink type, blocks of white are printed, each block printed with a color comprised of white ink mixed with incremental percentages of the CMY colors. In an embodiment, the range of percentages for each individual color may range from 1% to 10%. In an embodiment, the white blocks are printed in 0.5% increments. In another embodiment, an increment of about 0.4% may be used. For example, a set of blocks may be printed using the ink type mixed as follows:

Blocks of cyan: {0% cyan, 0.39% cyan, 0.78% cyan, 1.18% cyan, 1.67% cyan, 1.96% cyan, 2.35% cyan, 2.75% cyan, 3.14% cyan, 3.53% cyan, 3.92% cyan}

Blocks of magenta: {0% magenta, 0.39% magenta, 0.78% magenta, 1.18% magenta, 1.67% magenta, 1.96% magenta, 2.35% magenta, 2.75% magenta, 3.14% magenta, 3.53% magenta, 3.92% magenta}

Blocks of yellow: {0% yellow, 0.39% yellow, 0.78% yellow, 1.18% yellow, 1.67% yellow, 1.96% yellow, 2.35% yellow, 2.75% yellow, 3.14% yellow, 3.53% yellow, 3.92% yellow}

In an embodiment, blocks may also be printed with combinations of these colors. The selection of these percentages corresponds to distinct RGB values that are relative to 255. Thus, the difference between an RGB value of 233 and 234 is $\frac{1}{255}$ or 0.39%. However, any sufficiently small increment may be used.

In Step 410, the color density of each printed block may be measured and the measurement stored in association with the percentage of color used to print the measured block. An instrument such as a densitometer, spectrophotometer, or a camera may be used to measure the color of each of the blocks on an RGB scale. A densitometer is a device that measures the degree of darkness, i.e. the optical density, of a photographic or semitransparent material or of a reflecting surface. The densitometer is basically a light source aimed at a photoelectric cell. It determines the density of a sample placed between the light source and the photoelectric cell from differences in the readings. A densitometer may read color from black (none) to white (all). Densitometers may read three colors at a time red, green and blue. Three densitometers may be used inside each unit with a filter for each different color.

Spectrophotometry is the quantitative measurement of the reflection or transmission properties of a material as a function of wavelength. It is more specific than the general term electromagnetic spectroscopy in that spectrophotometry deals with visible light, near-ultraviolet, and near-infrared, but does not cover time-resolved spectroscopic techniques. Spectrophotometry involves the use of a spectrophotometer, which is a photometer that can measure intensity as a function of the light source wavelength. Important features of spectrophotometers are spectral bandwidth and linear range of absorption or reflectance measurement.

A spectrophotometer and a densitometer are similar devices. A densitometer is used to measure intensity of a single wavelength. Better devices allow a few discrete wavelengths such as the typical red, green and blue (RGB). A spectrophotometer is a more sophisticated piece of equipment than a densitometer. A spectrophotometer uses a prism and an array of sensors to measure the density of all the colors at once: red-orange-yellow-green-blue-purple and hundreds in between. However, a spectrophotometer costs about the same as a densitometer, so it is common to use a spectrophotometer to simply read red-green-blue.

A camera may be used to determine an RGB value for an area of perceptibly uniform color. The camera may measure the RGB values of various pixels within the area and average the RGB values of the pixels to derive an average RGB value for the area. A camera may be used to measure RGB values instead of using dedicated densitometers. For example, a camera described in issued U.S. Pat. No. 8,459,773 may be used to measure RGB values.

In an embodiment of the invention, a spectrophotometer may be integrated into the printer; however, a densitometer or camera may alternatively be used.

Furthermore, those skilled in the art will appreciate that other techniques may be used to measure the white layer to determine if a white balance correction is required in accordance with the invention herein.

FIG. 3 is an example table of measured and recorded RGB values (on a scale from 0 to 255) for each block that was printed. The columns of the table represent the percentage of cyan, magenta, or yellow that the printer was requested to print for each block. The values in the cyan rows include the red value, the green value, and the blue value that were recorded after measuring the RGB values for a printed block of cyan. For example, the Cr row contains the measured red value when measuring a block of cyan that was printed with an intensity corresponding to the column value. For example, the Cr value in the 0.78% value column is 238. The Cg row contains the measured green value when measuring a block of cyan for the various intensities. "Mg" represents the green measurement of the magenta printed blocks, and "Yb" represents the blue measurement of the yellow printed blocks.

The measured RGB values seen in the table of FIG. 3 are used to derive the values in the table in FIG. 4. The values in FIG. 4 are percentages of cyan, magenta, and yellow, rather than RGB values. The column headings for FIG. 3 and FIG. 4 are the same, but 3 RGB values are used to determine the single entry in a row of cyan, magenta, or yellow. For example, in the column 0.78% of FIG. 3, there are 3 values for cyan: red=238, green=240, and blue=244. RGB values may be converted to CMY values due to current technology optical color recognition technology returning RGB values and color printers using a CMYK color model. If/when CMY color measurement technology becomes practical to use, the table shown in FIG. 4 may be constructed without needing FIG. 3. Alternatively, an RGB-based printer may use FIG. 3 as the white balance profile, because there will be no need to convert to CMY.

Figure 5:
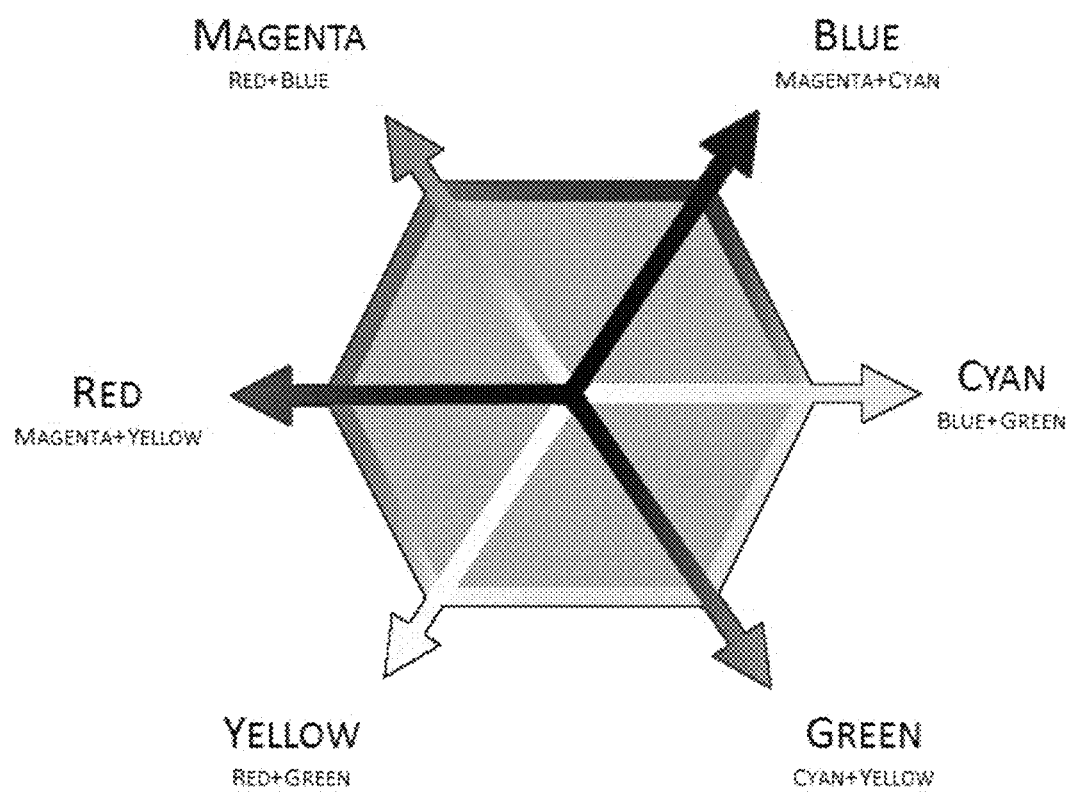
FIG. 5 illustrates a color wheel showing the inverse colors, according to an embodiment of the invention.

In Step 420, the three RGB values are used to determine the corresponding C, M, Y values for the rows in FIG. 4. The color wheel in FIG. 5 illustrates the inverse color as being located directly across the circle. For example, magenta and green are directly across from each other, and thus, magenta is the inverse color to green. Likewise, blue and yellow are inverse colors and red and cyan are inverse colors. For ideal true colors, a formula to convert RGB values to a percentage of cyan would simply be 1−(red value/255). That is, red is directly measured, and cyan, the inverse of red, may be determined by subtracting the red measured percentage from 100%. Other formulae may be used to reflect an imperfect world. For example, a formula used to compute the values in FIG. 4 is:

Cyan %=((Blue value+Green value)/2−Red value)/255

Magenta %=((Red value+Blue value)/2−Green value)/255

Yellow %=((Red value+Green value)/2−Blue value)/255

To determine a cyan percentage from our example {238, 240, 244}:

Cyan %=((244+240)/2−238)/255

(484/2−238)/255

(242−238)/255

4/255=1.57%

In Step 430, the converted CMY values for each measured block may be stored in a white balance profile. The profile is expressed as a table in this example. However, the profile may be represented as multiple lines of comma separated values.

In an embodiment, a printer manufacturer may create a white balance profile for each ink set supported by the printer, and the white balance profiles may be stored in a media database that is shipped with the printer. In another embodiment, an ink manufacturer may create a white balance profile for their ink on a particular printer and the profile may be downloaded into the printer over the Internet.

Printing an Image on a Colored Background Using a Separate White Layer

When printing an image on a colored background, a two-step process may be used. The first step is to print a layer of white onto the colored background where the image will eventually be printed, and the second step is to print the image on top of the white layer. However, if the white layer does not completely cover the colored background, a color needs to be to mixed into the white layer so that the white layer appears neutral.

Figure 6:
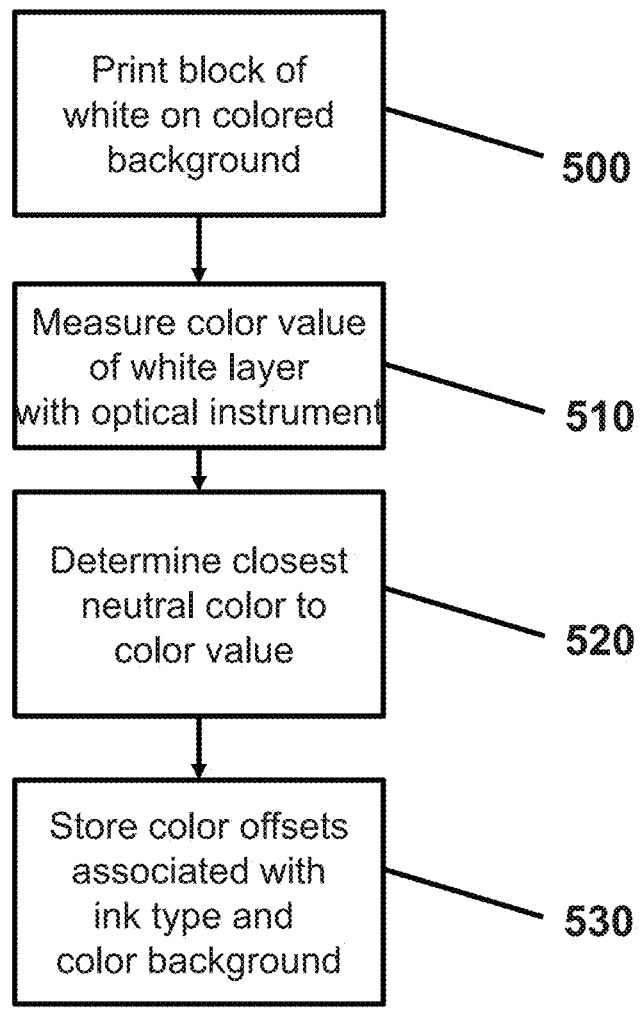
FIG. 6 is a flow diagram that shows how to automatically configure a printer for white balancing using a background layer of white on a colored medium, according to an embodiment of the invention.

In certain high end printers, the process of determining which colors to mix may be performed automatically by the printer. FIG. 6 is a flow diagram that shows how to automatically configure a printer for white balancing a background layer of white on a colored medium. In Step 500, a test block of white, such as would be printed as the white layer, is printed on the colored background. In Step 510, a spectrophotometer or other similar device in the printer scans a portion of the test white block to determine the RGB values of the block. For example, printing a test white block on a blue background may be measured as having the following RGB readings values {R=238, G=238, B=253}. The RGB value for white is {255,255,255} so the example measured value is close to white, but may have a bluish tinge.

In Step 520, the color closest to a neutral color is determined for the measured white layer. The neutral color most closely corresponding to the measured RGB value has red, green, and blue values equal to the lowest value across the red, green, and blue measurements. The lowest of the RGB values, which is 238 in our example, is subtracted from each of the RGB values, resulting in {R=0, G=0, B=15}. These resulting RGB values represent the difference from the nearest achievable neutral color. The measured white layer on the colored medium is measured at $15/255$ or 5.88%.

Knowing a color's measured value allows determining how to white balance that color. For example, if a color is created by mixing 1% red with white, then adding 1% of red's inverse color (i.e. cyan) may restore the color to white (or other neutral color). If a color is measured as comprising a 2% blue value, then adding 2% yellow may restore the color to neutral. In general, each of the colors CMY has an opposite/inverse color that is added to the mixture in the same percentage. A neutral color such as white or gray have all three RGB values equal to each other, such as black (0, 0, 0), white (255,255,255), and at least 254 shades of gray, e.g. (138, 138, 138). The human eye perceives the differences in density of the red, green, and blue color at least as much, if not more so, as the absolute density of each color. Thus, only the percentage difference in density needs to be preserved to have the same effect. To make the white layer appear neural, the bluish tinge may be corrected by adding 5.88% of blue's inverse color, yellow, to the white layer when printing on this colored medium. Thus, a small amount of yellow may be added to the example test white block to make the white layer appear less blue and more neutral.

In Step 530, the offsets may be stored in a configuration entry for the particular colored material for future use. This configuration entry may be selected in the future for use when white balancing the printer for a particular print job to be printed on the same colored material using the same type ink. Thus, the use of a spectrophotometer may only be needed the first time printing on a particular colored material, and the results saved for future use.

Figure 7:
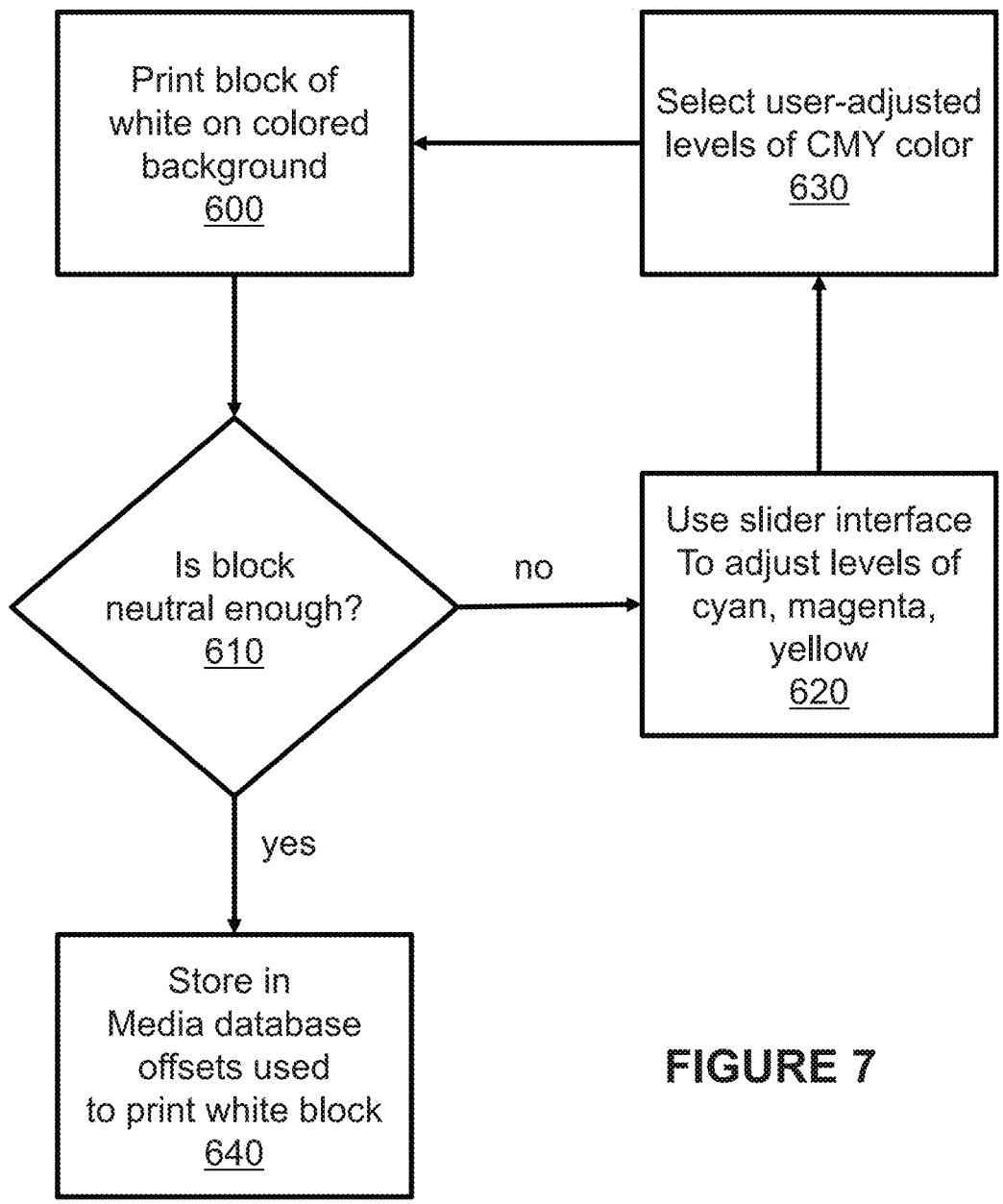
FIG. 7 is a flow diagram that shows how to manually configure a printer for white balancing a background layer of white on a colored medium, according to an embodiment of the invention.

For printers not including a spectrophotometer or other optical measuring device, an alternate manual process may be used to configure the printer white balance for a particular colored background and ink set. FIG. 7 is a flow diagram that shows how to manually configure a printer for white balancing a background layer of white on a colored medium. The first step, Step 600, is the same as Step 500 in FIG. 6. A test block of white is printed on the colored background. However, in Step 610, instead of using a spectrophotometer, the user visually inspects the test white block to determine whether it is neutral enough or whether white balancing is needed. If the block is not neutral enough, then in Step 620, a user may use a slider user interface such as shown in FIG. 8 to specify how to adjust the printer colors of magenta, cyan, and yellow.

Figure 8:
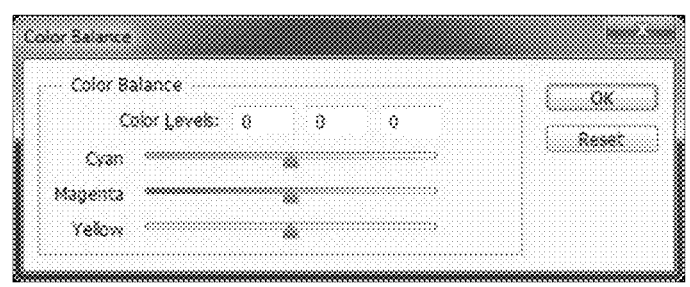
FIG. 8 shows a user interface with which white balance can be adjusted when printing an image on a colored medium according to an embodiment of the invention.

FIG. 8 shows a user interface which may be used to manually adjust white balance when printing an image on a colored medium according to the invention. In FIG. 8, user controls are provided to allow individual print ink colors (CMY) to be adjusted from 0.001-10% of the base white ink layer that is to be applied to the medium. In this embodiment, the printer automatically prefers light inks over dark inks to reduce graininess in the white layer. The white balance slider user interface may be run on a computer that is directly connected to the printer or on a network where the printer resides. In Step 630, the offsets selected on the white balance slider are used to configure the printer, and in Step 640, the user prints another test white block using the new printer configuration. The user inspects the new test white block and continues in this trial and error fashion until the resulting test white block in Step 610 appears neutral enough. At Step 640, the offset values used to configure the printer that resulted in a white block being neutral enough may be stored in the media database in association with the colored media and ink set.

Using the Printer Configuration for White Balancing

Figure 9:
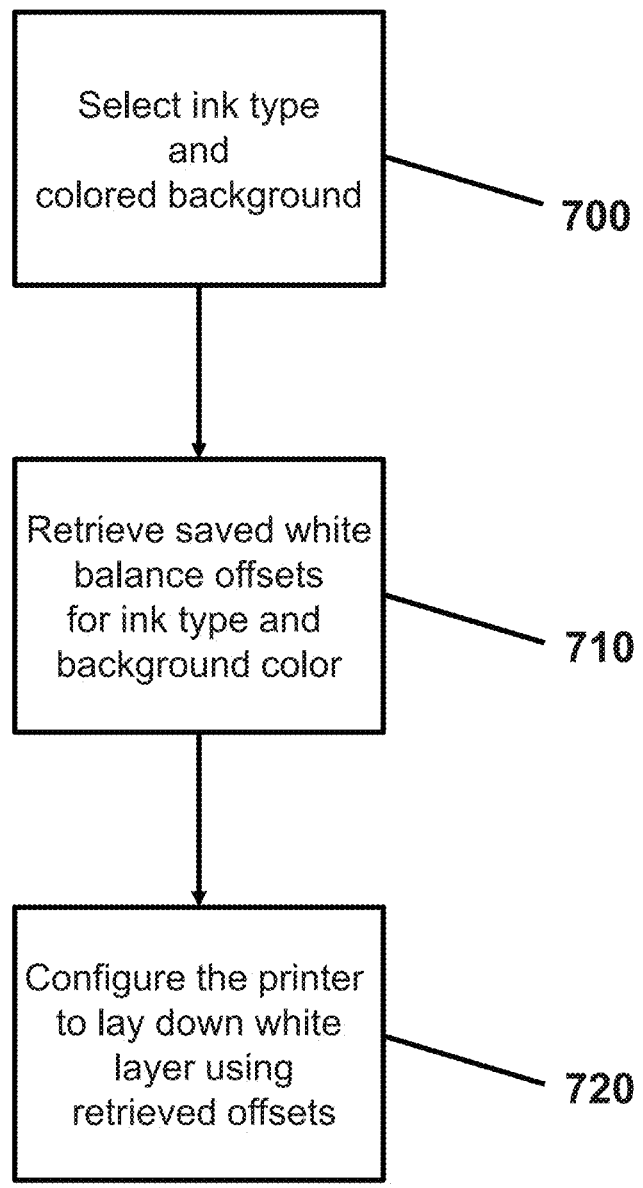
FIG. 9 is a flow diagram that shows how to print an image on a colored medium, according to an embodiment of the invention.

When a user wants to print an image on a colored material for which offsets have been stored in the media database, the printer configuration process may proceed as illustrated in FIG. 9. FIG. 9 is a flow diagram that shows how to print an image on a colored medium. The configuration dialog may include selecting the ink set type and identifying the colored material for which offsets have been calibrated (in Step 700). Before the image is printed on the medium, the offsets for that colored medium are retrieved from the media database (Step 710). For example, continuing with the above example, the user may configure the printer by providing the identifier for the blue substrate type for which offsets were stored in a configuration entry of the media database. The offset color value(s) are each found in the corresponding row of the white balance profile of FIG. 4 to determine how much of cyan, magenta, and yellow to request the printer to use when printing the white layer. The desired percentage of yellow ink stored in the configuration entry is 5.88%. The value 5.88% is looked up in the yellow row of the white balance profile. The value 5.88% is in between columns 1.57% and 1.96%, so the printer would be requested to print a percentage of yellow that is between 1.57% and 1.96%, to correct the white layer. In an embodiment, more than one of magenta, cyan, and yellow may need to be added to the white layer to correct for the colored substrate. In that case, each of the added colors may be independently looked up in FIG. 4 to find the percentage of that color to request of the printer.

The information retrieved from the white balance profile may be used to configure the inks to use for printing the white balance layer (Step 720). When the white layer is printed, the white layer will reflect the offsets known to counteract the underlying media color.

OTHER EMBODIMENTS

In an embodiment of the invention that provides a media database for the various types of media that are to be used with a printer, a description of the medium may be provided, and the printer software may warn the user in certain instances, e.g. using flood white on a particular substrate, may not result in a true white background. In this example, the warning to the user may offer the user the option to neutralize the effect of the colored medium on the white layer by selecting the addition of a colored ink to add to the white layer, as discussed above. The user could choose to select the addition of color to the white layer or could print without adding color to the white layer.

In another embodiment of the invention, a facility built into the printer, in a separate tool, or with a cell phone camera having an installed app allows the user to take a picture or use a sensor to look at the medium and then, based on picture, the user can select a correct profile in the printer for that medium, and the profile is then applied to the white layer automatically.

In another embodiment of the invention, the density of a printed image may be measured for consistency over the course of an extended print run, for example at a print shop from the beginning of the day to the end of the day. Periodic measurement of white layer color can be taken, and used to maintain a consistent print quality. Thus, if values for a white layer applied to a medium vary from neutral, the system may automatically adjust the profile to account for such variations; or, if the medium itself varies from package to package, then adjustments can be made to the amount of color to be added to the white layer to maintain a neutral white balance. In this later embodiment of the invention, spot checks may be performed on the medium and adjustments made to the white layer profile to account for variations in the medium from lot to lot.

Computer Implementation

Figure 10:
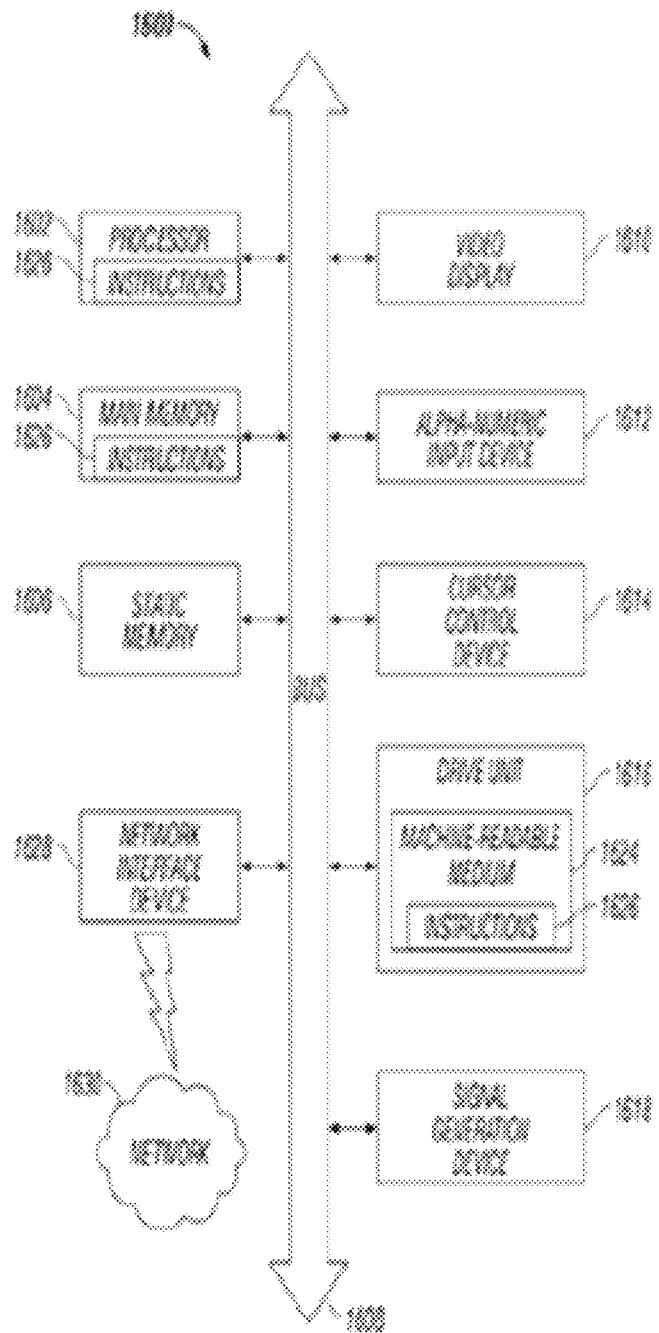
FIG. 10 is a block schematic diagram that depicts a machine in the exemplary form of a computer system within which a set of instructions for causing the machine to perform any of the herein disclosed methodologies may be executed.

FIG. 10 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A method comprising:
   receiving, from a camera, data that is representative of an image of the substrate;
   identifying a profile that matches a particular media type and a particular color of the substrate that are determined via analysis of the data;
   retrieving, from the profile, a first offset color value for a first offset color;
   printing on the substrate a first layer of ink that includes white ink;
   wherein the printed first layer of ink reduces visibility of the particular color of the substrate; and
   printing a second layer of ink on top of the printed first layer of ink.

2. The method of claim 1, wherein the particular color is a color other than white.

3. The method of claim 1, wherein the first offset color value indicates an amount of the ink other than white.

4. The method of claim 1, wherein the printed first layer of ink appears as a neutral color.

5. The method of claim 4, wherein the neutral color makes the particular color not visible.

6. The method of claim 1, wherein said identifying is based on user preference, and wherein an inkset includes a plurality of inks having white ink, cyan ink (C), magenta ink (M), and yellow ink (Y).

7. The method of claim 6, wherein the white ink is opaque, and wherein the C ink, the M ink, and the Y ink are transparent process inks.

8. The method of claim 1, further comprising:
   determining that the first layer of ink will not result in a near white background;
   alerting a user that the first layer of ink will not result in the near white background; and
   adding, based on user selection, a color to the white ink, such that the printed layer of ink includes the added color.

9. An electronic device comprising:
   a network interface for communicating with a sensor over a communication channel;
   a processor; and
   a memory having instructions stored thereon that, when executed by the processor, cause the processor to:
      receive, from the sensor, data from which a characteristic of a substrate is derivable;
      identify, based on the data, a profile that matches a particular media type and a particular color of the substrate;
      retrieve, from the profile, a first offset color value for a first offset color; and
      transmit directions to print on the substrate a first layer of ink that includes white ink;
   wherein the printed first layer of ink reduces visibility of the particular color of the substrate.

10. The device of claim 9, wherein the sensor is an optical measuring device and the data is representative of an image of the substrate.

11. The device of claim 9, wherein the sensor is any of built into a printer, in a separate tool, a part of a cell phone, or any combination thereof.

12. The device of claim 9, wherein the sensor is a camera.

13. The device of claim 9, wherein the instructions further cause the processor to:
- measure a region of a white layer printed on the substrate with an optical measuring device;
- determine, based on the measurement obtained from the optical measuring device, a color value for the region;
- determine an offset color value of an offset color, wherein the offset color value indicates an amount of ink to mask the particular color of the substrate when printing the first layer on the substrate; and
- store, in the memory, the determined color value in a stored configuration file in association with the particular media type of the substrate.

14. A method comprising:
- receiving, from a camera, an image of a substrate;
- identifying a profile that matches a particular media type and/or particular color of the substrate determined via analysis of the image;
- retrieving, from the profile, a first offset color value for a first offset color;
- printing the first offset color on the substrate to create a first layer of ink; and
- printing a second layer of ink on top of the first layer of ink.

15. The method of claim 14, wherein the particular color is a color other than white.

16. The method of claim 14, wherein the first offset color value indicates an amount of the first offset color that is a color other than white.

17. The method of claim 14, wherein the first layer of ink appears as a neutral color.

18. The method of claim 17, wherein the neutral color makes the particular color of the substrate not visible.

19. The method of claim 14, wherein said identifying is based on user preference, and wherein an inkset includes a plurality of inks having white ink, cyan ink (C), magenta ink (M), and yellow ink (Y).

20. The method of claim 14, further comprising:
- determining that the first layer of ink will not result in a near white background;
- alerting a user that the first layer of ink will not result in the near white background;
- adding, based on user selection, a second offset color to white ink, such that the first layer of ink comprises the white ink and the second offset color.

* * * * *